(12) United States Patent
Buck (10) Patent No.: US 11,408,394 B2
(45) Date of Patent: Aug. 9, 2022

(54) SENSOR DEVICE FOR AN AERODYNAMIC ELEMENT

(71) Applicant: Siemens Gamesa Renewable Energy A/S, Brande (DK)

(72) Inventor: Steven Buck, Boulder, CO (US)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 255 days.

(21) Appl. No.: 16/132,795

(22) Filed: Sep. 17, 2018

(65) Prior Publication Data
US 2020/0088162 A1    Mar. 19, 2020

(51) Int. Cl.
*F03D 7/02* (2006.01)
*F03D 7/04* (2006.01)

(52) U.S. Cl.
CPC ......... *F03D 7/0224* (2013.01); *F03D 7/0256* (2013.01); *F03D 7/0296* (2013.01); *F03D 7/042* (2013.01); *F05B 2270/328* (2013.01); *F05B 2270/333* (2013.01); *F05B 2270/334* (2013.01); *F05B 2270/80* (2013.01)

(58) Field of Classification Search
CPC .... F03D 7/0224; F03D 7/0256; F03D 7/0296; F03D 7/042; F05B 2270/80; F05B 2270/328; F05B 2270/333; F05B 2270/334; Y02E 10/72; G01H 9/00; G01H 1/03
See application file for complete search history.

(56) References Cited

U.S. PATENT DOCUMENTS

| 2009/0169378 A1* | 7/2009 | Menke | F03D 7/0224 |
| | | | 416/1 |
| 2009/0290982 A1* | 11/2009 | Madsen | F03D 1/0675 |
| | | | 416/61 |
| 2009/0308971 A1 | 12/2009 | Shams et al. | |
| 2010/0247314 A1* | 9/2010 | Narasimalu | F03D 7/0232 |
| | | | 416/146 R |
| 2011/0110778 A1* | 5/2011 | Lim | F03D 7/0232 |
| | | | 416/61 |
| 2014/0003938 A1 | 1/2014 | Esbensen et al. | |

(Continued)

FOREIGN PATENT DOCUMENTS

| EP | 2952860 A2 | 12/2015 |
| WO | 2016066170 A1 | 5/2016 |
| WO | 2017180192 A1 | 10/2017 |

OTHER PUBLICATIONS

International Search Report and Written Opinion for related PCT Application No. PCT/EP2019/073121, dated Nov. 27, 2019. 18 pages.

*Primary Examiner* — J. Todd Newton
*Assistant Examiner* — Jesse M Prager
(74) *Attorney, Agent, or Firm* — Schmeiser, Olsen & Watts LLP (57) ABSTRACT

A sensor device for measuring flow-separation on an aerodynamic element, including a number of compliant elements with aerodynamic and/or structural properties designed to allow flow-induced vibrational motion in an air current and a sensor-element designed to measure vibrations of the number of compliant elements is provided. Further provided is an aerodynamic element, e.g. a wind turbine blade or an airfoil, with such sensor device, a method for controlling the angle of attack of an aerodynamic element, a controlling device and a wind turbine.

7 Claims, 4 Drawing Sheets

(56) References Cited

U.S. PATENT DOCUMENTS

2014/0054894 A1\* 2/2014 Olesen ............... F03D 7/00
                                                          290/44
2016/0312763 A1\* 10/2016 Arce ............... F03D 1/0633
2017/0342960 A1\* 11/2017 Enevoldsen ........... F03D 17/00

\* cited by examiner

SENSOR DEVICE FOR AN AERODYNAMIC ELEMENT

FIELD OF TECHNOLOGY

The following describes a sensor device for an aerodynamic element, especially for a wind turbine, an aerodynamic element, e.g. a wind turbine blade or an airfoil, with such sensor device, a method for controlling the angle of attack of an aerodynamic element, a controlling device and a wind turbine.

BACKGROUND

Aerodynamic flow separation on an airfoil or wind turbine blade generally causes rapidly increasing drag, decrease in lift, and drastic increase in acoustic noise. Modern large turbines are therefore typically designed to avoid flow separation for the vast majority of operational conditions. However, under extreme and off-design conditions such as high wind-shear, yaw-error, and in strong gusts, flow separation can occur nonetheless, causing these detrimental effects to turbine performance.

Aerodynamically, flow separation has the disadvantageous effect of reduced efficiency and power production, as well as unsteady loads and increased fatigue, thereby reducing the lifetime of a turbine.

An acoustic disadvantage is, the noise increases by approximately 10 dB(A) for separated flow. However, separation is often periodic with the blade passing frequency (e.g. for high shear conditions), which results in intense modulations in acoustic emission referred to as "thump noise".

The prior art reflects several methods for detecting aerodynamic flow separation within the wind turbine industry. One method explained in U.S. Pat. No. 8,408,871 B2 uses a measure of dynamic pressure in the boundary layer of a rigid blade in a rake-like configuration to detect stall. The method is intrusive into the flow, potentially causing high frequency tonal noise under certain operating conditions. It also requires several pressure sensors and orients the sensors into the flow, which make this design susceptible to damage and clogging.

Another sensor, described in Patent No. EP 2075462 B1, uses either a microphone or accelerometer to detect the stall condition. However, microphone measurements, while promising, were proven to be less unreliable in an internal study using data from a full-scale research turbine. It is unclear how robust a method based on accelerometer measurements might be, but it is known that such measurements are significantly influenced by inflow turbulence conditions.

Finally, another proposed method explained in U.S. Pat. No. 8,002,524 B2 is based on a distribution of fiber-optic strain gauge measurements. Such a system would likely be quite expensive, due to both the cost of the fiber-optic sensor network and the added manufacturing cost of embedding the strain gauge within the blade.

All solutions of the state of the art have their own disadvantages. It is very difficult to achieve an optimal easy suppression of flow separation.

SUMMARY

An aspect relates to improving the known devices and methods to facilitate an easy suppression of flow separation on an aerodynamic element like a wind turbine blade or an airfoil. invention further aspect provides a sensor-device and a method of detecting stall based on a non-intrusive measurement (e.g. visualization) of a highly turbulent separated flow.

A sensor device according to embodiments of the invention is suitable for measuring flow-separation on an aerodynamic element. Such aerodynamic element is preferably a wind turbine blade or an airfoil. The sensor device of embodiments of the invention are preferably suitable for measuring fluctuations of an air current flowing around the turbine blade of a wind turbine or around an airfoil.

The sensor device comprises a number of compliant elements with aerodynamic and/or structural properties designed to allow flow-induced vibrational motion in an air current downstream of the trailing edge of an aerodynamic element and a sensor-element designed to measure vibrations of the number of compliant elements. The whole sensor device is preferably designed such that it can be arranged downstream of the trailing edge of an aerodynamic element.

Since the compliant elements are designed to vibrate in an air current, they must not be completely rigid, but must be able to deform in said wind current. However, a compliant element could deform in various manners. The vibrational amplitude of the compliant element should be catered to the sensitivity of the sensor. Preferably, the measured vibrational signal should be significantly higher than the electrical noise floor of the sensor (including the noise of the data acquisition), but not so high as to ever overload the system. In the following there is described a number of examples that are preferred embodiments for compliant elements for embodiments of the invention.

For example, the whole compliant element could be highly compliant and deform in the air current, i.e. it deforms significantly as an unsteady, separation-induced flow passes. In another example it could also be stiffer, i.e. elastic with a self-aligning torque, i.e. the deformation will be smaller, but the vibrational energy could be greater. The element could also comprise regions of varying stiffness, e.g. being thinner or more elastic or comprise hinges at a certain location and be more rigid or stiffer at another location, wherein the region with the lower stiffness should be positioned nearer to the aerodynamic element. The compliant elements could vibrate on behalf of strain deformations, or perhaps on behalf of some kind of hinged motion. There is preferably one row of compliant elements, but depending on the use, there also may be more stacked rows of compliant elements.

An aerodynamic element according to embodiments of the invention comprises a sensor device as described above, wherein this sensor device is located downstream of the trailing edge of the aerodynamic element. Preferably, the aerodynamic element is an airfoil or wind turbine blade or any blade of a rotor. The aerodynamic element may comprise only one sensor device at a certain region of the trailing edge, a sensor device arranged over a vast region of the trailing edge or several sensor devices arranged at several points or regions of the trailing edge.

A method according to embodiments of the invention for controlling the angle of attack of an aerodynamic element as described above comprises the following steps:

First, the vibration of a compliant element of a sensor device of the aerodynamic element is measured (with the sensor-element).

Then the pitch angle and/or rotation speed of the aerodynamic element is adjusted based on the measurement of the vibration. This could e.g. be accomplished by adjusting the pitch angle and/or rotation speed in the case flow-separation occurs to a point where no flow-separation is measured.

It is clear that the angle of attack of the aerodynamic element or the relative speed between the aerodynamic element and the air current must be adjusted to avoid flow separation. The angle of attack is defined as the angle of a local section of the aerodynamic element with respect to the local inflow direction. Thus, flow separation depends on the angle of attack and the speed of the aerodynamic element relative to the air current. The pitch angle of the aerodynamic element and the rotation speed is what could be directly controlled by the wind turbine actuators. By adjusting the pitch angle, the angle of attack is adjusted relative to a steady air current. Since the angle of attack is also a function of the rotational speed, the rotational speed could be changed to alter the angle of attack.

Since the angle of attack or the speed of an air current may vary along the span of the aerodynamic element, it is preferred that the aerodynamic element comprises a sensor device arranged over a vast region of the trailing edge or several sensor devices arranged at several points or regions of the trailing edge, as described above.

A controlling device according to embodiments of the invention for adjusting the angle of attack of an airstream on an aerodynamic element as described above, is preferably designed to perform the method for controlling the angle of attack of an aerodynamic element as described above. The controlling device comprises:

Means to measure the vibration of a compliant element of a sensor device of the aerodynamic element. These means are preferably already realized in the sensor device. The sensor-element of the sensor device is designed to measure the strength of the vibration of the compliant element and a comparator unit of the sensor device is designed to determine if the strength of the vibration exceeds a predefined threshold.

A control unit to adjust the pitch angle and/or the rotation speed of the aerodynamic element based on the measurement of the vibration. Since means for adjusting the pitch angle or rotation speed of the aerodynamic element are normally existing in a wind turbine, these means could be combined with a signal-unit of the sensor device that bias the control unit to perform the adjustment.

The vibration signal measured by the sensors can e.g. be fed to a data acquisition computer that combines a comparator-unit and a signal-unit and may influence the turbine's controller (control unit) of a wind turbine. When stall is detected, the control unit can reduce the operating angle of attack by either pitch or RPM (rotation speed) control.

A wind turbine according to embodiments of the invention comprise an aerodynamic element according to the invention and a controlling device as described above.

In general, as already mentioned above, the compliant element may have an arbitrary shape, as long as it is able to vibrate in an air current. However, there are preferred shapes that are able to perform a vibrational movement that is advantageous for embodiments of the present invention.

According to a preferred sensor device, a compliant element has an elongated shape, preferably with a ratio of length to width greater than 3 to 1, especially greater than 10 to 1, in particular greater than 30 to 1. The compliant element is designed to be attached perpendicular to the trailing edge of the aerodynamic element. Thus, this preferred compliant element is intended to be attached with its narrow side to an aerodynamic element and to protrude from the trailing edge of this aerodynamic element, preferably substantially following the curvature of the upper surface of the aerodynamic element, i.e. the surface directed to the suction side of the aerodynamic element in an incoming air current.

Although a compliant element may have an arbitrary shape, the Preferred dimensions of a compliant element are:

A minimum length of 1 cm, preferably a minimum length of 3 cm, and/or a maximum length of 20 cm, preferably a maximum length of 10 cm.

A minimum width of 1 mm, preferably a minimum width of 2 mm, and/or a maximum width of 40 mm, preferably a maximum width of 20 mm.

Preferably, the sensor device comprises more than two compliant elements that are protruding from a common root-element, wherein the compliant elements are arranged parallel to each other. The preferred spacing of the compliant elements are a minimum spacing to an adjacent compliant element of 1 mm, preferably of 2 mm, and/or a maximum spacing to an adjacent compliant element of 10 mm, preferably of 4 mm. If many compliant elements are used following this setup, this arrangement would result in a serration or a comb structure.

Preferably in praxis, compliant elements are expected to be no less than 3 cm long, typically 7-10 cm. Depending on the application, compliant elements are no longer than 20 cm. Preferred compliant elements in praxis are between 2 and 4 mm wide. Preferred compliant elements in praxis have a spacing to another of 1 to 2 mm. However, the generalized device made of compliant elements could also be significantly smaller, perhaps only 3 to 6 cm long or 1 to 3 cm long. These are very rough examples, since conceptually such a device could function with a very wide range of sizing.

According to a preferred sensor device, the number of compliant elements are designed as filaments of a comb-structure or as teeth of a serration, preferably as filaments of a combed serration or a combed trailing edge treatment device of an airfoil or a wind turbine blade. Since in some embodiments a serration is attached at the trailing edge of wind turbine blades to reduce acoustic emission, these serrations may be replaced by serrations or combs according to embodiments of this invention with elastic teeth or elastic filaments that are able to vibrate in the air current. Teeth of the serrations could e.g. be expected to be no less than 3 cm long, typically 7-10 cm, and no longer than 20 cm. The width is preferably proportional to the length, where aspect ratios between 1.2 and 2 are common. The teeth are preferably triangular.

In respect to the preferred combed serrations, at least the filaments of the combs are rendered to accord to embodiments of the invention (to vibrate in an air current). Since in a combed serration, the comb material is preferably the same as it is used for the serration, the dimensions of the filaments of the comb are chosen such that the filaments are able to vibrate in an air current. The ends of the filaments could be longer or shorter compared with the tips of the serration. The filaments lie preferably in the plane of the serration, but they could also be arranged above or below the serration, depending on the actual use.

In a preferred sensor device, the sensor-element comprises a special sensor or a group of special sensors. These sensors do not necessarily have to measure the same parameter value, it is preferred that while using different sensors to use different types of sensors, as well. The advantage to measure different parameters is the reduction of systematic errors.

A preferred sensor is an optical sensor for optical measurements, e.g. a camera. Another preferred sensor is a strain gauge-sensor connected with the compliant element. Alternatively (or in addition) the strain gauge sensor could be integrated in a compliant member resulting in a compliant member formed as strain gauge element. Another preferred sensor is an accelerometer that is preferably mounted on the compliant element, measuring the acceleration of the compliant element. Another preferred sensor is an acoustic sensor, especially measuring sound waves generated by the aerodynamic element. Preferred combinations are combinations of a optical sensor together with one of the above listed alternatives, a strain gauge sensor combined with an acceleration sensor or an acoustic sensor. Preferred is also a combination of an acceleration sensor with an acoustic sensor.

Optical detection with an optical sensor (e.g. a camera), for example, would have the potential benefit of detecting stall over a wide spanwise region, whereas a single strain gauge sensor is only usable only for a narrow region.

Regarding acoustic measurements, they are difficult to take because of the chaotic nature of the flow in the region the sensor device is usually positioned on an aerodynamic element. Detecting the acoustic signature of the compliant element would be difficult with all of the background noise. However, by using a compliant element as defined above, it has a certain resonance frequency (eigenfrequency), especially, if its self-aligning torque is great enough to result in a vibration if the compliant element is struck. Preferably an acoustic sensor or a device processing these measurements are designed such that they filter the resonance frequency from the sensor measurements and process the filtered resonance frequency, only. This could be enhanced by measuring the structure-borne sound near a compliant element or in a compliant element. This could e.g. be achieved by a microphone measuring only a narrow frequency band of the structure-borne sound at the trailing edge of a blade.

A preferred sensor device comprises a comparator-unit designed to determine if the vibration of the compliant element exceeds a predefined threshold. The comparator-unit is preferably designed to measure the amplitude or energy of the vibration (e.g. the variance of the compliant element's deflection taken by a camera), a lift coefficient or a strain gauge signal, an acceleration signal or an acoustic signal of the sensor-element. The comparator-unit may also calculate the gradient of a series of measurements and compare this gradient to a predefined threshold value (e.g. a maximum deviation from a mean-value).

A preferred sensor device comprises a signal-unit designed to create a control signal based on the vibration of the compliant element. The control signal is designed to bias a control unit of a wind turbine to adjust the pitch angle and/or the rotation speed of the aerodynamic element according to the control signal. The control signal from the sensor device could preferably be a single value (e.g. a binary flag) that tells the main control system whether flow separation (or stall) is occurring on a critical portion of the blade, i.e. at the sensor location. It also could be an indicator for the strength of vibration (e.g. an integer value). How this is translated to a change in pitch could be handled in various ways, but likely would be handled by the main controller, e.g. of a wind turbine.

A preferred method for controlling the angle of attack of an aerodynamic element according to embodiments of the invention comprise the following steps.
a) Measuring the strength (e.g. the amplitude or the energy) of the vibration of a compliant element at different times at a first pitch angle of the aerodynamic element.
b) Comparing this measurement with a predefined threshold-value.
c) Changing the pitch angle of the aerodynamic element from the first pitch angle to a second pitch angle, if the measurement exceeds the predefined threshold-value.
d) Measuring the strength of the vibration of a compliant element at the second pitch angle of the aerodynamic element.
e) Repeating steps b) to d) until the measurement of the strength of the vibration at the second pitch angle lies below the predefined threshold-value. It should be noted, that the expressions "first pitch angle" and "second pitch angle" is only used to distinguish the different pitch angles before and after the change. The "first pitch angle" is the pitch angle before the change and the "second pitch angle" is the pitch angle after the change. During the repetition (in the case where the measurement at the second pitch angle still exceeds the predefined threshold-value), the "second pitch angle" will become the "first pitch angle".

Since the best angle of attack is just before the drastic increase of vibration that occurs during flow separation, it is preferred that the second pitch angle differs less than 5°, especially less than 2°, from the first pitch angle, i.e. the position where flow separation occurred.

An alternative or additional preferred method for controlling the angle of attack of an aerodynamic element according to embodiments of the invention, comprise the following steps.
a) Measuring the strength (e.g. the amplitude or the energy) of the vibration of a compliant element at different times at a first rotation speed of the aerodynamic element.
b) Comparing this measurement with a predefined threshold-value.
c) Changing the rotation speed of the aerodynamic element from the first rotation speed to a second rotation speed (e.g. lower than the first rotation speed), if the measurement exceeds the predefined threshold-value.
d) Measuring the strength of the vibration of a compliant element at the second rotation speed of the aerodynamic element.
e) Repeating steps b) to d) until the measurement of the strength of the vibration at the second rotation speed lies below the predefined threshold-value. It should be noted, that the expressions "first rotation speed" and "second rotation speed" is only used to distinguish the different rotation speeds before and after the change (regarding "first rotation speed" and "second rotation speed" see the explanations in regard to "first pitch angle" and "second pitch angle").

According to a preferred method the threshold-value is determined with calibration measurements, preferably while measuring the vibrations with different pitch angles and/or different rotation speeds and/or during different wind velocities.

A preferred method comprises the steps:
Measuring the vibration of a compliant element of a sensor device of the aerodynamic element at different pitch angles of the aerodynamic element.
Adjusting the pitch angle of the aerodynamic element in the direction of the pitch angle where weaker vibrations have been measured in the case where the measurement exceeds a predefined threshold value.

Embodiments of the invention have the advantage that it provides a reliable and non-intrusive sensor device and method of detecting flow separation on a wind turbine blade or airfoil, even for short periods of time. With such a sensor device implemented in a controlling device, appropriate compensation can be made, e.g. by adjusting the pitch angle and/or the rotation speed of the blade in order to reduce the operating angle of attack and re-attach the flow.

Turbine operation with active stall detection would allow turbine designers to robustly operate turbines at higher angles of attack. This results directly in the possibility to reduce turbine loads and construct lighter rotors, what leads to more inexpensive turbines and improved cost of energy.

BRIEF DESCRIPTION

Some of the embodiments will be described in detail, with reference to the following figures, wherein like designations denote like members, wherein.

DETAILED DESCRIPTION

Figure 1:
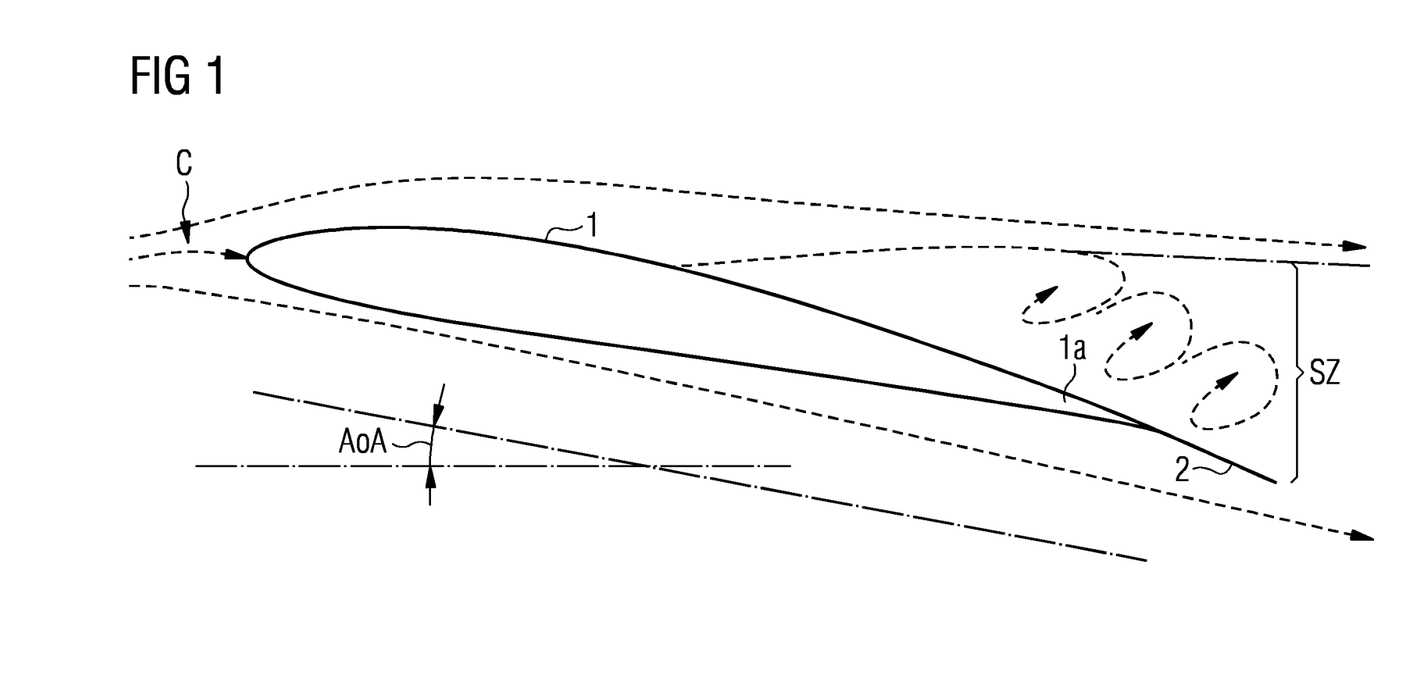
FIG. 1 shows a cross section of an embodiment of an aerodynamic element.

FIG. 1 shows a cross section of a preferred aerodynamic element 1, e.g. an airfoil or wind turbine blade, comprising a sensor device 2 according to embodiments of the invention. The sensor device 2 is located downstream of the trailing edge of the aerodynamic element 1.

An air current C is indicated flowing against the aerodynamic element 1 in a certain angle of attack AoA. Here a great angle of attack AoA is shown, where flow separation occurs at about the half of the upper surface of the aerodynamic element 1 forming a "separation zone" SZ where flow separation occurs. This is indicated with eddies at the trailing edge 1a of the aerodynamic element 1.

Figure 2:
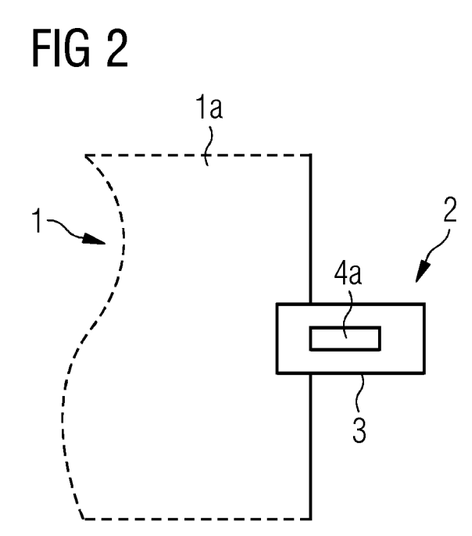
FIG. 2 shows a top view on an embodiment of a sensor device.

FIG. 2 shows a top view on a preferred sensor device 2 positioned at the trailing edge 1a of an aerodynamic element 1. The sensor device 2 comprises a compliant element 3 having an elongated shape attached perpendicular to the trailing edge 1a of the aerodynamic element 1. This compliant element 3 is able to vibrate in an air current and will strongly vibrate if the air current is turbulent.

An accelerometer 4a as sensor-element 4a is mounted on the compliant element 3, measuring the acceleration of the compliant element 3 during vibration. Here, also a strain gauge sensor 4b (see FIG. 3) could be used that is included in the compliant element 3 so that the compliant element 3 itself can be used as a strain gauge element.

Figure 3:
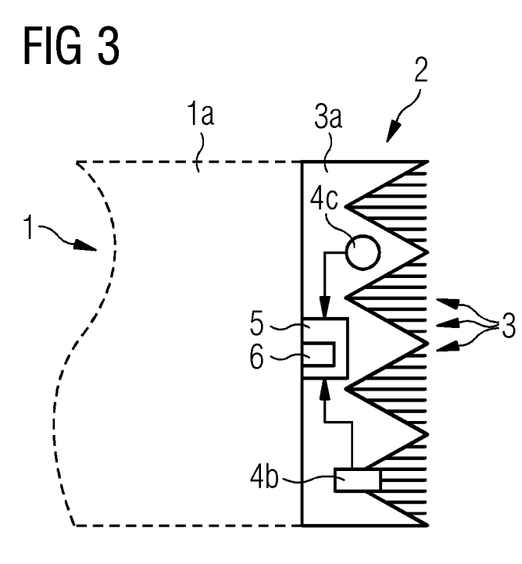
FIG. 3 shows a top view on a further embodiments of a sensor device.

FIG. 3 shows a top view on a further preferred sensor device 2. The sensor device 2 comprising a vast number of compliant elements 3 protruding from a common root-element 3a. The compliant elements 3 are designed as filaments of a comb-structure of a combed serration.

The sensor device 2 comprises two different sensor-elements 4b, 4c, for example an optical sensor 4c for optical measurements (could also be an acoustic sensor) and a strain gauge sensor 4b.

The sensor device 2 comprises a comparator-unit 5 designed to determine if the vibration of a compliant element 3, exceeds a predefined threshold, and a signal-unit 6 designed to create a control signal based on the vibration of a compliant element 3. The sensor-elements 4b and 4c are providing their measured values to the comparator-unit 5 for comparison with a predefined threshold value T.

Figure 6:
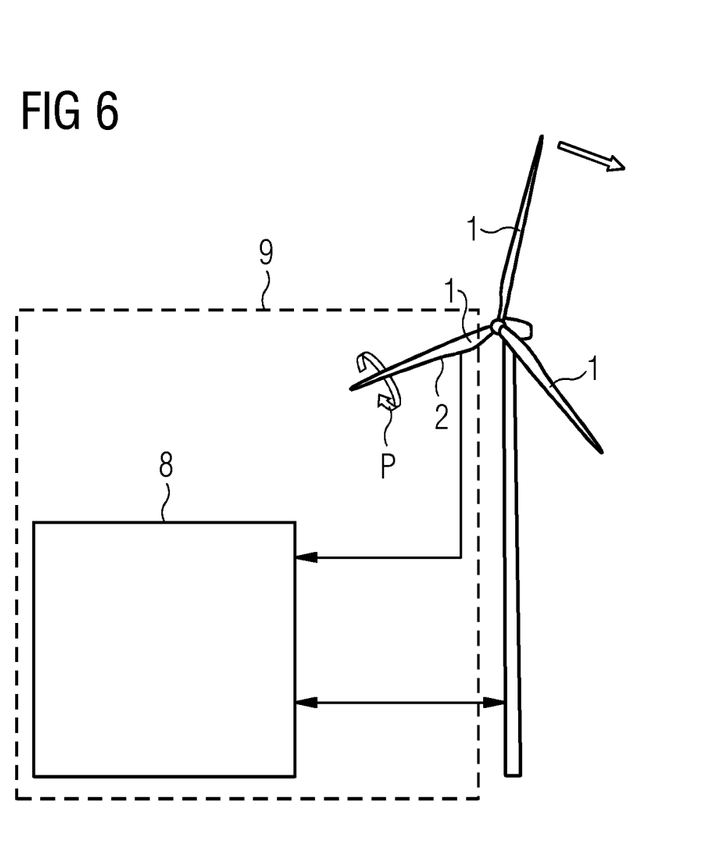
FIG. 6 shows an embodiment of a wind turbine.

Looking at FIG. 6, the signal-unit 6 of this sensor device 2 (shown in FIG. 3) preferably communicates with the control unit 8 of a wind turbine 7, biasing this control unit 8 to adjust the pitch angle P of the aerodynamic element 1.

Figure 4:
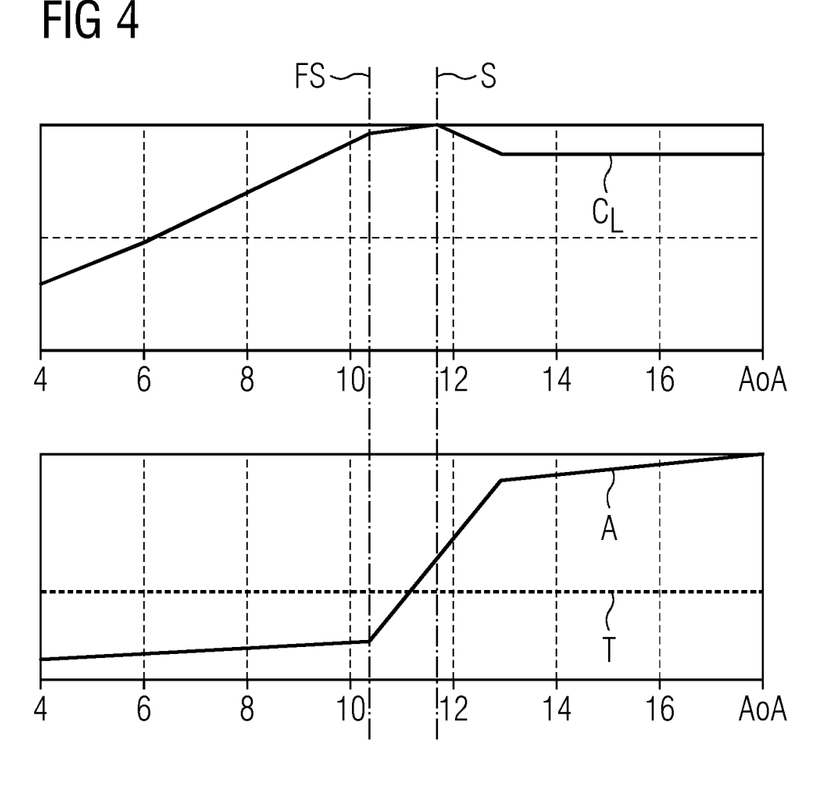
FIG. 4 shows exemplary measurements of a sensor element.

FIG. 4 shows two exemplary measurements of a sensor element at different angles of attack AoA. The upper diagram shows a measured lift coefficient $C_L$ of an aerodynamic element 1, the lower diagram shows the amplitude A of the vibration of a compliant element 3 (see e.g. FIG. 2 or 3). At an angle of attack AoA greater 10° flow separation FS occurs (shown with the left dash/dottet line). At an angle of attack AoA of about 11.5°, stall S occurs (shown with the right dash/dottet line) i.e. as soon as lift starts to reduce with angle of attack. This can be seen by characteristic changes in the gradient of the upper diagram. For example, the Amplitude A will rise strongly at a steep gradient when flow separation FS occurs.

In the lower diagram, a predefined threshold value T is shown. If the amplitude A exceeds this threshold value, this is interpreted that flow separation FS occurs. In this example, flow separation FS has already occurred but loss of lift (i.e. stall) has not when the threshold value T is exceeded. This could be optimized by calibration measurements or by a combined comparison of different values, e.g. the absolute amplitude A and the gradient of the amplitude A.

Figure 5:
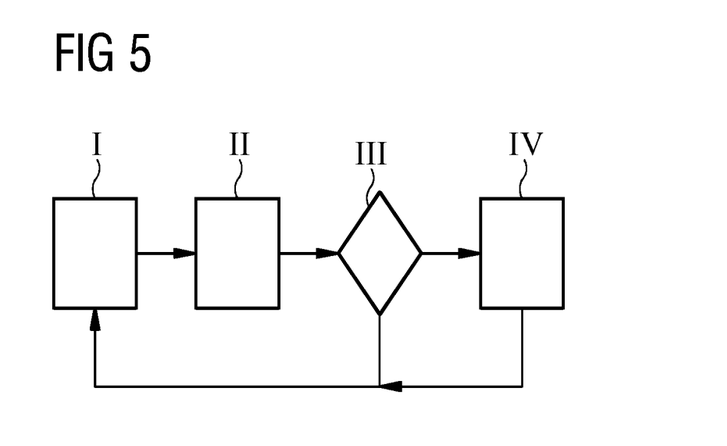
FIG. 5 shows a block diagram of an embodiment of a method.

FIG. 5 shows a block diagram of a preferred method for controlling the angle of attack AoA of an aerodynamic element 1.

In step I, the vibration of a compliant element 3 of a sensor device 2 of the aerodynamic element 1 with the respective sensor-element 4a, 4b, 4c (see e.g. FIG. 2 or 3). The strength of the vibration of a compliant element 3 is measured continuously at different times, since the direction and/or strength of the wind current may change anytime.

In step II, every measurement is compared with a predefined threshold-value T.

In step III it is decided, whether the threshold-value T is exceeded or not. Since the direction and/or strength of the wind current may change anytime, this decision should be repeated with every measurement. If the threshold-value T is not exceeded, the method continues with step I.

In step IV, the pitch angle P of the aerodynamic element 1 (now called "first pitch angle P") is changed to a second pitch angle P, if the measurement exceeds the predefined threshold-value T.

After that, the method continues with step I, wherein the strength of the vibration of a compliant element at the second pitch angle P of the aerodynamic element 1 is measured.

It is preferred, that the change of the pitch angle is performed such that the second pitch angle P, where the threshold value T is not exceeded differs less than 5° from the first pitch angle P, where the threshold value T is exceeded.

The threshold-value T could be predefined as static value. However, it could be determined with calibration measurements, preferably while measuring the vibrations with different pitch angles P and/or preferably during different wind velocities.

FIG. 6 shows a preferred wind turbine 7 comprising three aerodynamic elements 1 (wind turbine blades) and a controlling device 9. The rotor of the wind turbine rotates in an air current in the direction of the straight arrow shown at the upper wind turbine blade.

An aerodynamic element 1 comprises a sensor device 2 according to embodiments of the invention. Although due to enhance clearness, only one reference sign is shown, it is preferred that every aerodynamic element 1 comprises a sensor device 2. The sensor devices 2 each comprise a number of compliant elements 3 and sensor-elements 4a, 4b, 4c and could e.g. be designed as shown in FIGS. 1 to 3.

The controlling device is formed by the sensor device(s) 2 and the control unit 8 of the turbine. The control unit 8 is able to adjust the pitch angle P (a change of the pitch angle P is shown by the curved arrow around the upper wind turbine blade).

In the case the sensor-element 4a, 4b, 4c of a sensor device 2 of an aerodynamic element 1, measures a strong increase of the vibration of the compliant element (3) of this sensor device, the pitch angle P of this aerodynamic element 1 is adjusted by the control unit 8.

In the diagrams, like numbers refer to like objects throughout. Objects in the diagrams are not necessarily drawn to scale.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements. The mention of a "unit" or a "device" does not preclude the use of more than one unit or device.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising:
    an aerodynamic element;
    a sensor device for detecting flow-separation on the aerodynamic element, the sensor device comprising:
        a plurality of compliant elements with aerodynamic and/or structural properties designed to allow flow-induced vibrational motion in an air current downstream of a trailing edge of the aerodynamic element, wherein the plurality of compliant elements are designed as at least one of: filaments of a comb-structure, teeth of a serration, filaments of a combed serration, and a combed trailing edge treatment device;
        a sensor-element designed to measure vibrations of the plurality of compliant elements at different times;
        a comparator unit configured to determine if the vibrations of the plurality of compliant elements exceed a predefined threshold where flow-separation occurs without a loss of lift; and
        a signal-unit configured to create a control signal based on the vibrations of the plurality of compliant elements if the comparator determines that the measured vibrations exceed the predefined threshold,
    a control unit, the control unit configured to receive the control signal from the signal-unit of the sensor device and adjust a pitch angle and/or a rotation speed of the aerodynamic element according to the control signal.

2. The wind turbine of claim 1, wherein the sensor-element comprises at least two different types of sensors operably connected to the plurality of compliant elements.

3. The wind turbine of claim 1, wherein a compliant element of the plurality of compliant elements has an elongated shape with a ratio of length to width greater than 3 to 1, and is designed to be attached perpendicular to the trailing edge of the aerodynamic element.

4. The wind turbine of claim 3, wherein each compliant element of the plurality of compliant elements comprises:
    a minimum length of 1 cm,
    and/or
    a maximum length of 20 cm,
    and/or
    a minimum width of 1 mm,
    and/or
    a maximum width of 40 mm.

5. The wind turbine of claim 1, wherein the plurality of compliant elements comprises more than two compliant elements protruding from a common root-element, wherein the more than two compliant elements are arranged parallel to each other having a minimum spacing to an adjacent compliant element of 1 mm, and/or a maximum spacing to an adjacent compliant element of 10 mm.

6. The wind turbine of claim 1, wherein the sensor-element comprises at least two different types of sensors.

7. The wind turbine of claim 6, wherein the at least two different types of sensors include:
    a sensor for optical measurements,
    or
    a strain gauge-sensor connected with a compliant element of the plurality of compliant elements or a compliant element formed as strain gauge element,
    or
    an accelerometer that is mounted on the compliant element, measuring an acceleration of the compliant element,
    or
    an acoustic sensor measuring sound waves in the aerodynamic element.

* * * * *